(12) United States Patent
Werner et al.

(10) Patent No.: US 11,526,669 B1
(45) Date of Patent: Dec. 13, 2022

(54) KEYWORD ANALYSIS IN LIVE GROUP BREAKOUT SESSIONS

(71) Applicant: INTERNATIONAL BUSINESS MACHINES CORPORATION, Armonk, NY (US)

(72) Inventors: John S. Werner, Fishkill, NY (US); Tyler Gross, New York, NY (US); Arkadiy O. Tsfasman, Wappingers Falls, NY (US); Brandon M. Kobilka, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/304,429

(22) Filed: Jun. 21, 2021

(51) Int. Cl.
*G06F 40/279* (2020.01)
*G06F 3/04842* (2022.01)
*H04L 65/403* (2022.01)

(52) U.S. Cl.
CPC ........ *G06F 40/279* (2020.01); *G06F 3/04842* (2013.01); *H04L 65/403* (2013.01)

(58) Field of Classification Search
CPC .................................................. G06F 40/279
USPC ............................................................ 704/9
See application file for complete search history.

(56) References Cited

U.S. PATENT DOCUMENTS

| | | | | |
|---|---|---|---|---|
| 3,981,087 A | * | 9/1976 | Sachs | G09B 7/04 434/335 |
| 5,572,728 A | * | 11/1996 | Tada | G06F 16/40 715/201 |
| 9,483,557 B2 | * | 11/2016 | Thambiratnam | G06F 16/7844 |
| 9,626,875 B2 | | 4/2017 | Gal | |
| 9,648,061 B2 | * | 5/2017 | Cunico | G06N 5/022 |
| 9,652,113 B1 | * | 5/2017 | Colson | G06Q 10/1095 |
| 10,068,490 B2 | | 9/2018 | Hibbs | |
| 10,110,645 B2 | * | 10/2018 | Bader-Natal | H04L 65/1093 |
| 10,325,510 B2 | * | 6/2019 | Jain | G09B 5/14 |
| 11,228,625 B1 | * | 1/2022 | Libin | G06V 40/176 |
| 2005/0069849 A1 | * | 3/2005 | McKinney | G09B 17/00 434/178 |
| 2007/0168864 A1 | * | 7/2007 | Yamamoto | G06F 16/739 707/E17.026 |
| 2013/0083008 A1 | * | 4/2013 | Geisner | A63F 13/67 345/419 |

(Continued)

*Primary Examiner* — Reza Nabi
(74) *Attorney, Agent, or Firm* — Teddi E. Maranzano

(57) ABSTRACT

A method, system and computer program product are provided. An analysis module receives a plurality of presentation source materials, including text documents, books, video files, audio files, and presentations. A transcript is generated from audio and video received from a presenter device during a live teaching session. Keywords are extracted from the plurality of presentation source materials. An integrated keyword list is created by integrating the extracted keywords with the generated transcript. Participants in an online meeting are grouped into live group breakout sessions, each of which is independent. Data from each participant is continuously recorded in the breakout session. The correlation between the integrated keyword list and the recorded participant output is periodically analyzed to output a score trendline to determine the level of comprehension by the participants of the presentation materials. The score trendline and the scores for each breakout session are displayed on a presenter dashboard.

17 Claims, 5 Drawing Sheets

(56) References Cited

U.S. PATENT DOCUMENTS

| | | | | |
|---|---|---|---|---|
| 2014/0335497 | A1* | 11/2014 | Gal | G09B 7/00 |
| | | | | 434/323 |
| 2015/0199912 | A1* | 7/2015 | Wandler | G09B 5/125 |
| | | | | 434/362 |
| 2016/0063873 | A1* | 3/2016 | Zimmer | G06Q 50/20 |
| | | | | 434/353 |
| 2016/0203726 | A1* | 7/2016 | Hibbs | G09B 7/02 |
| | | | | 434/308 |
| 2016/0255086 | A1* | 9/2016 | Vajravelu | H04L 63/101 |
| | | | | 726/4 |
| 2017/0147576 | A1* | 5/2017 | Des Jardins | G06Q 30/0256 |
| 2018/0204576 | A1* | 7/2018 | Dhoot | H04L 65/1083 |
| 2018/0247549 | A1* | 8/2018 | Martin | G09B 19/00 |
| 2019/0005978 | A1* | 1/2019 | Barnett | G06F 3/165 |
| 2019/0012046 | A1* | 1/2019 | Marzouk | G06F 3/0486 |
| 2020/0105245 | A1* | 4/2020 | Gupta | G06F 40/205 |
| 2020/0226942 | A1* | 7/2020 | Marvaniya | G06Q 10/101 |
| 2020/0279566 | A1* | 9/2020 | Wash | H04L 12/283 |
| 2020/0293607 | A1* | 9/2020 | Nelson | G06F 40/30 |
| 2020/0293608 | A1* | 9/2020 | Nelson | G06F 40/169 |
| 2020/0293616 | A1* | 9/2020 | Nelson | G06Q 10/101 |
| 2020/0302816 | A1* | 9/2020 | Williams | G09B 7/02 |
| 2020/0357386 | A1* | 11/2020 | Gao | G10L 15/08 |
| 2021/0274255 | A1* | 9/2021 | Aher | H04N 21/462 |
| 2021/0375289 | A1* | 12/2021 | Zhu | G10L 15/26 |
| 2021/0375291 | A1* | 12/2021 | Zeng | G06F 16/535 |

\* cited by examiner

KEYWORD ANALYSIS IN LIVE GROUP BREAKOUT SESSIONS

BACKGROUND

Embodiments of the present invention generally relate to computer systems, and more specifically to analyzing keywords in live breakout sessions.

Developments in networking technology have increased speed and reliability of internet connections, thereby accelerating the development of applications that facilitate activities such as working remotely, shopping, accessing educational offerings, and social networking.

Currently, communication applications, such as Zoom, allow smaller groups of users to break out from a larger group and work independently of the other groups. However, these applications lack sufficient tools to assist a meeting presenter to oversee or gather insight into the activities of these smaller groups.

Therefore, it would be advantageous to improve remote meetings by more closely mimicking the in-person meeting experience.

SUMMARY

Among other things, a method is provided. An analysis module receives a plurality of presentation source materials, including text documents, books, video files, audio files, and presentations. A transcript is generated from audio and video received from a presenter device during a live teaching session. Keywords are extracted from the plurality of presentation source materials. An integrated keyword list is created by integrating the extracted keywords with the generated transcript. Participants in an online meeting are grouped into live group breakout sessions, each of which is independent. Data from each participant is continuously recorded in the breakout session. The correlation between the integrated keyword list and the recorded participant output is periodically analyzed to output a score trendline to determine the level of comprehension by the participants of the presentation materials. The score trendline and the scores for each breakout session are displayed on a presenter dashboard.

Embodiments are further directed to computer systems and computer program products having substantially the same features as the above-described computer-implemented method.

Additional features and advantages are realized through the techniques described herein. Other embodiments and aspects are described in detail herein. For a better understanding, refer to the description and to the drawings.

BRIEF DESCRIPTION OF THE SEVERAL VIEWS OF THE DRAWINGS

The subject matter which is regarded as the present invention is particularly pointed out and distinctly claimed in the claims at the conclusion of the specification. The foregoing and other features and advantages are apparent from the following detailed description taken in conjunction with the accompanying drawings in which:

DETAILED DESCRIPTION

Figure 1:
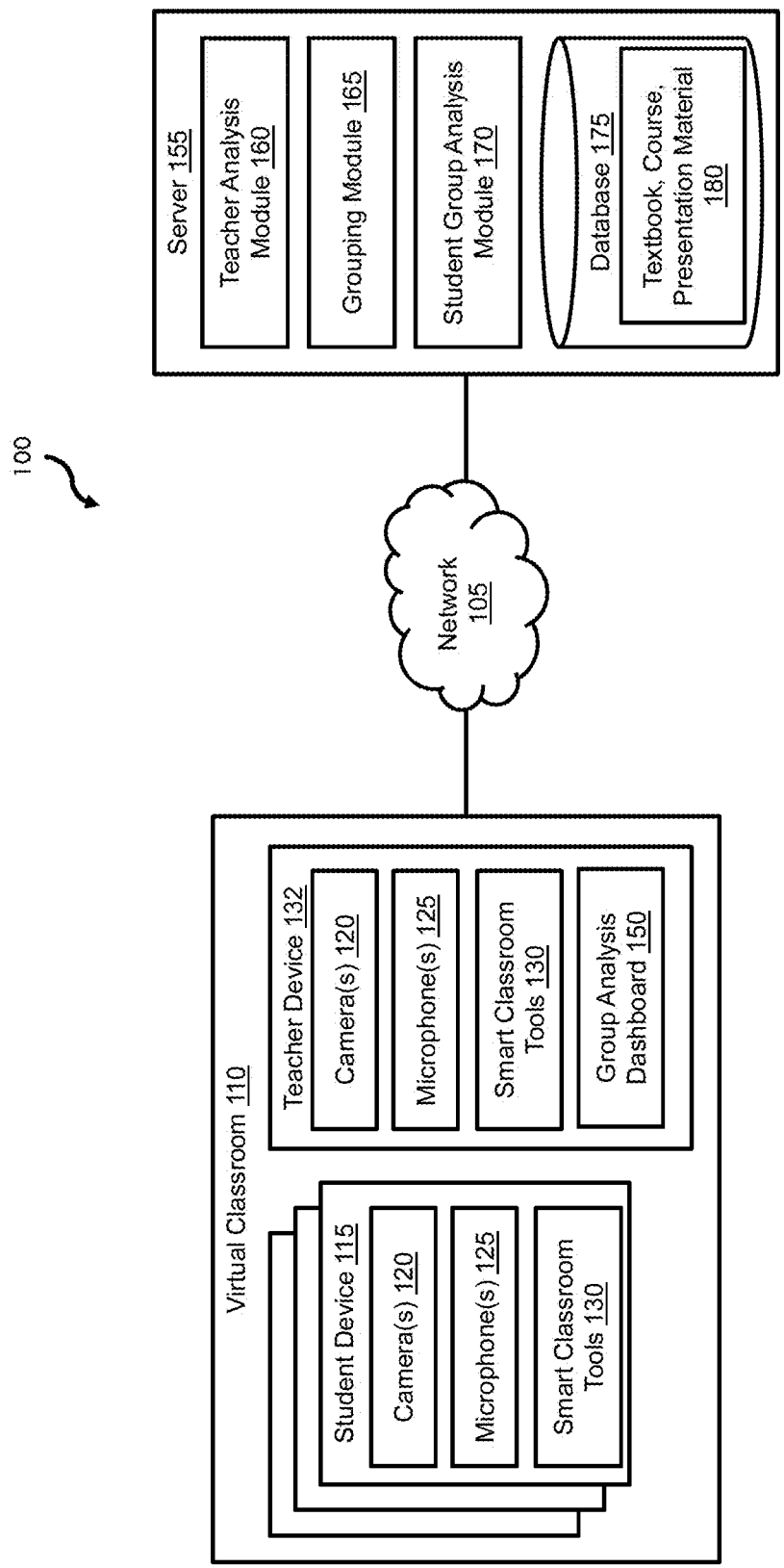
FIG. 1 is a functional block diagram of an illustrative system for collaborating using live group breakout sessions, according to an embodiment of the invention.

The present disclosure relates generally to the field of user computing technologies, and in particular to technologies used in managing remote meetings where groups of students gather.

High speed network technology is now generally available through internet service providers to residential customers, business enterprises, and to the classroom. Consequently, there is an increased reliance on high speed network technology for activities that were traditionally conducted in-person. One result is a decrease in the amount of time and cost spent commuting, as travel to an office or classroom is less necessary. Also, in case of inclement weather, illness, or other emergencies, a schedule of normal activities may be maintained while remaining at home or another remote location.

Some examples of traditionally in-person activities now popularly occurring using high speed network technology include online work-related meetings, socializing, shopping, accessing a library for research, and attending classes through distance learning. However, to facilitate understanding of the present invention, the context of the online teacher-student classroom will be presented. A desired goal for the remote classroom is that little difference should exist between the physical and the remote teaching experience. Communication applications, such as Zoom and WebEx®, allow smaller groups of students to break out from a larger group, independently explore an assigned topic, and eventually rejoin the larger group. The students may be geographically distant from each other, and from the teacher. Currently, communication applications lack sufficient tools to assist a teacher to oversee or gather insight into the activities of groups in breakout sessions, diminishing the effectiveness of the remote teaching experience (WebEx is a registered trademark of Cisco Systems, Inc.). For example, while breakout sessions exist today, the teacher has no insight into the groups once the breakout session is created. If the teacher wants to understand the progress of students in the group, such as to know who has questions, if the students are distracted, fooling around, or if they are unknowingly going off topic or not doing the task correctly, the teacher randomly selects and manually joins a group to listen in to for a little while.

Embodiments of the present invention enhance the remote teaching experience by more closely mimicking the in-person group breakout session experience. Keywords and key concepts are extracted from the presentation materials and from the classroom activity while the teacher is presenting. During a breakout session in which students are split into groups, the teacher may monitor the conversation and the work being performed to determine the level of correlation to the material that was presented prior to the forming of groups. A dashboard may be updated such that the teacher can assess the performance of each group in real-time or near real-time. The information displayed on the dashboard can assist the teacher in knowing what the students in the various groups are discussing, thereby allowing the teacher to join a group based on metrics indicating the group needs assistance.

To protect the privacy of the students and the confidentiality of any discussions, students are advised that a system for collaborating using live group breakout sessions will be active and their comments and reactions to the presentation materials during the breakout sessions may be recorded. Upon being presented a privacy statement, for example on the student device 115, the students can be asked to agree to the privacy terms prior to fully activating the system 100, particularly prior to activating the student group analysis module 170.

Embodiments of the invention will now be described in more detail in connection with the Figures.

FIG. 1 is a functional block diagram 100 of an illustrative system for collaborating using live group breakout sessions (system), according to an embodiment of the invention.

The system 100 includes a virtual classroom 110 and a server 155 interconnected via a wired or wireless network 105. The virtual classroom 110 may include any software capable of being configured for remote meetings, such as WebEx®, Zoom, and Hangouts® (Hangouts is a registered trademark of Google Inc.). The virtual classroom 110 further includes one or more student devices 115 and one or more teacher devices 132. Each student device 115 is operated by a student, and includes one or more cameras 120, microphones 125, and smart classroom tools 130. Typical student device 115 may include any device or combination of devices, such as a laptop or a tablet, which allows the student to connect to an online session of the virtual classroom 110. The student device 115 uses the cameras 120 and microphones 125 to extract data from the student's participation in the session, and communicates the extracted data to the student group analysis module 170. Once analyzed, the data is available to the teacher, who may use the data to monitor the progress of each of the breakout groups.

Smart classroom tools 130 include any smart or Internet of Things (IoT) device capable of extracting information produced by the student, and may include smart boards (e.g., RICOH Interactive Whiteboard powered by IBM Watson™), smart pens (e.g., Livescribe Echo™ Smartpen), keystroke, touchscreen, and mouse pointer logging for computers and laptops (e.g., Acoustic Tealeaf).

In the virtual classroom 110, each teacher device 132 is operated by a teacher, and similar to the student device 115, includes one or more cameras 120, microphones 125, and smart classroom tools 130. A typical teacher device 132 may include any device or combination of devices, such as a laptop or a tablet, which allows the teacher to connect to an online session of the virtual classroom 110. The cameras 120 and microphones 125 of the teacher device 132 extract data that can be analyzed by the teacher analysis module 160, as well as display information from students during a group breakout session.

The group analysis dashboard 150 receives data from student group analysis module 170 during a group breakout session to provide real time, or near real-time, updates to the teacher on the activities of the various breakout sessions, and rankings of the groups to indicate how well the groups are performing in the task.

These updates can indicate whether the group conversations are incorporating the key concepts in their discussions, and can help the teacher identify groups that may be struggling with the assigned task, such that the teacher can join the group's session to provide direction. This can be analogous to the teacher walking through the room and pausing momentarily to overhear the discussion at the breakout group. Based on the discussion, the teacher may continue to the next breakout group, or join the group's conversation. The group analysis dashboard 150 can display similarity scores to what was taught during the lesson. The similarity score defines how much overlap there is between the keywords in the lesson the teacher taught, and the keywords captured from the students' speech in the breakout groups. A low similarity score can indicate that the students are likely distracted and discussing topics unrelated to the assigned task. In addition to the similarity scores, the group analysis dashboard 150 can display context scores, which indicate if the group understands the material and if the students are using the keywords correctly. A group of students may have a high similarity score but still misunderstand the material, so that even though the students are using the correct keywords, the keywords are being used incorrectly. This can signal to the teacher to join the group and further explain the lesson content that generated the keywords. The server 155 is comprised of a teacher analysis module 160, a grouping module 165, a student group analysis module 170, and a database 175.

The teacher analysis module 160 receives audio and video input from the teacher device 132 and performs audio/visual analysis to generate a list of keywords on the topics discussed that will be used as input to the student group analysis module 170 The list of keywords can include weights to indicate the most influential terms and links to other keywords to show the relation between them. The microphone 125 and camera 120 of the teacher device 132 can capture the teacher presenting a live session, which will be analyzed and output to a transcript, via a speech to text conversion. The teacher analysis module 160 can additionally capture images, such as of visual props the teacher used during the live session, and images of content on whiteboards. The teacher may also upload additional information such as a lesson plan, agenda for the day, or textbook chapters/sections that will be included in the analysis to generate keywords and the teacher transcript. The output of the teacher analysis module 160 is text that can be saved in database 175 and additionally processed to produce a word cloud. The word cloud shows the most influential words, and clusters words together based on context.

The audio/visual analysis may be performed by a combination of IBM Watson™ APIs. For example, IBM Watson™ Visual Recognition uses deep learning algorithms to analyze images for scenes, objects, faces, and other content. IBM Watson™ Speech to Text enables speech transcription for use cases such as speech analytics. Speech is converted to text and analyzed for language patterns that can be tagged and categorized. Silence is also factored into the language pattern, as well as any sighs and inaudible sounds. The IBM Watson™ Natural Language Understanding may extract metadata from text, such as entities, keywords, categories, sentiment, emotion, relations, and syntax. The IBM Watson™ Natural Language Classifier can be used to build custom text classification models to be used to perform Natural Language Processing (NLP) to tokenize and parse language into elemental pieces. NLP includes parsing, stopword removal, part-of-speech tagging, in addition to tokenizing. NLP processing free form natural language text into a standardized structure that can be input to other processing, as needed.

The output can generate a list of variations of words and topics that are similar to the keywords directly used by the teacher. More details on the operation of the teacher analysis module 160 are discussed with reference to FIG. 2.

The teacher virtually separates students into groups for group breakout sessions using the grouping module 165. As a result, each breakout session can converse privately, and independently of the other sessions. The teacher can monitor all groups or select to monitor one or more groups.

For each breakout group, the student group analysis module 170 receives input from the student devices 115 in each group and performs audio/visual analysis on the members of the breakout group using, for example, IBM Watson™ APIs, or similar. The analysis is performed on the group as a whole. Each separate student device 115 sends its output to the server 155, which distributes the output from the student device 115 to other participants in the breakout group. Since the separate student streams are being input, it is possible to perform analysis on each individual student. If multiple students are in the same room and are using the same student device 115, the student group analysis module 170 can detect the different voices and analyze each of those separately.

The output from the group is then compared to the list of generated keywords that was output from the teacher module 160. The comparison is the number (i.e., the percentage) of overlapping keywords, which is the similarity score. Keywords that do not match can be expanded, for example, by performing additional analysis against a dictionary and/or thesaurus, to determine if the student is talking about the same keyword but using different terminology (e.g., "area under the curve" instead of "integral" which the teacher used). If there is still no match, the keywords do not negatively contribute to the similarity score.

The IBM Watson™ Document Correlator performs text analytics on text content from various sources to get a comprehensive picture of the correlation across the sources. This provides contextual feedback that is displayed on the group analysis dashboard 150, as discussed further with reference to FIG. 4. This allows the teacher to flow in and out of the student groups that may need assistance. The student group analysis module 170 may invoke a combination of IBM Watson™ APIs to perform the audio/visual analysis on the breakout groups by group, similar to that performed in the teacher analysis module 160. The student group analysis module 170 is discussed further with reference to FIG. 3.

Figure 2:
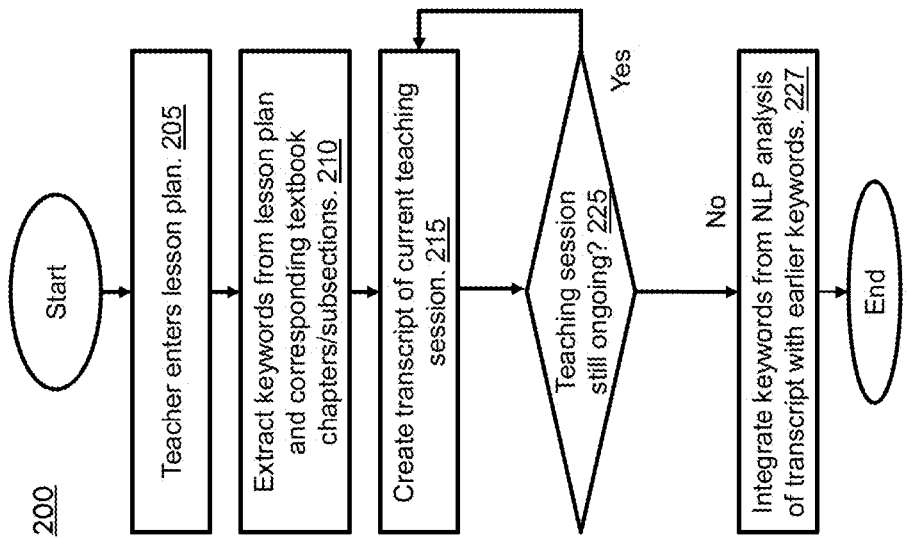
FIG. 2 is a flowchart of analyzing and creating a presenter transcript.

FIG. 2 is an exemplary flowchart 200 illustrating the execution of the teacher analysis module 160. Keywords are extracted from the transcript that was created from the live presentation. These keywords are combined with keywords that were extracted from other sources, including a lesson plan, relevant textbook, website, articles, PDFs, and presentation content.

The module execution begins at block 205 where a teacher enters the relevant lesson or presentation plan. This may typically include uploading of documents or pointing to files within database 175. In addition to residing in the database 175, documents may be stored in memory on the teacher device 132, or may be provided as web address links or 3$^{rd}$ party server storage, such as BOX™ (BOX is a registered trademark of Box, Inc.). The presentation plan info includes, but is not limited to, textbook information (e.g., the ISBN number and specific chapters and/or sections), websites, apps, books, articles, videos, additional handouts (e.g., PDFs), or any other file (e.g., word documents, PowerPoint slides, etc.).

At block 210, the teacher analysis module 160 extracts keywords from the relevant material that was entered at block 205. This extraction is performed by various IBM Watson™ APIs. For example, IBM Watson™ Natural Language Classifier is invoked to perform NLP. The NLP processes keywords and combinations of keywords that express the main points of the material, as well as variations of words/topics that are similar to the keywords directly used within the lesson plan or presentation material. A list is created at this block for the current lesson plan that can be stored in database 175. The documents that are input to the teacher analysis module 160 may be stored by user (teacher) profile. Alternatively, the documents may be deleted once the keywords are extracted At block 215, the teacher analysis module 160 generates a text-based transcript in real time from the audio/video output that was captured during a live learning session. The data was captured by the cameras 120, microphones 125, and smart classroom tools 130 of the teacher device 132. The teacher analysis module 160 performs audio/visual analysis by invoking various IBM Watson™ APIs, including IBM Watson™ Visual Recognition, IBM Watson™ Speech to Text, and IBM Watson™ Natural Language Understanding (NLU). NLU can be considered a subtopic of natural language processing in artificial intelligence. A focus of NLU is machine reading comprehension to: interpret the natural language; derive meaning; identify context; and draw insights. NLU may operate on text that has already been standardized by, for example, NLP.

The method then executes decision block 225 which determines if the current teaching session is currently ongoing. For example, the end of a teaching session can be signaled by such phrases as "That's all for today", "let's break into groups", etc. Alternatively, the teacher can trigger transcript creation with a button within virtual classroom 110 at the end of the teaching session. If the teaching session is ongoing (block 225 "Yes" branch), the method loops back to block 215 to continue with transcript creation and analysis.

If the teaching session is finished (block 225 "No" branch), the method executes block 227 in which an NLP analysis similar to that described in block 210 is performed on the transcript that was created at block 215. The keywords from this analysis are then integrated to the keyword list that was created from the lesson plan and course material at block 210. Material from the transcript will have higher weights for each node because it was included in multiple inputs. For example, the teacher transcript and a chapter within the textbook cover the same content, so those nodes will be larger. The final output is one integrated keyword list.

Figure 3:
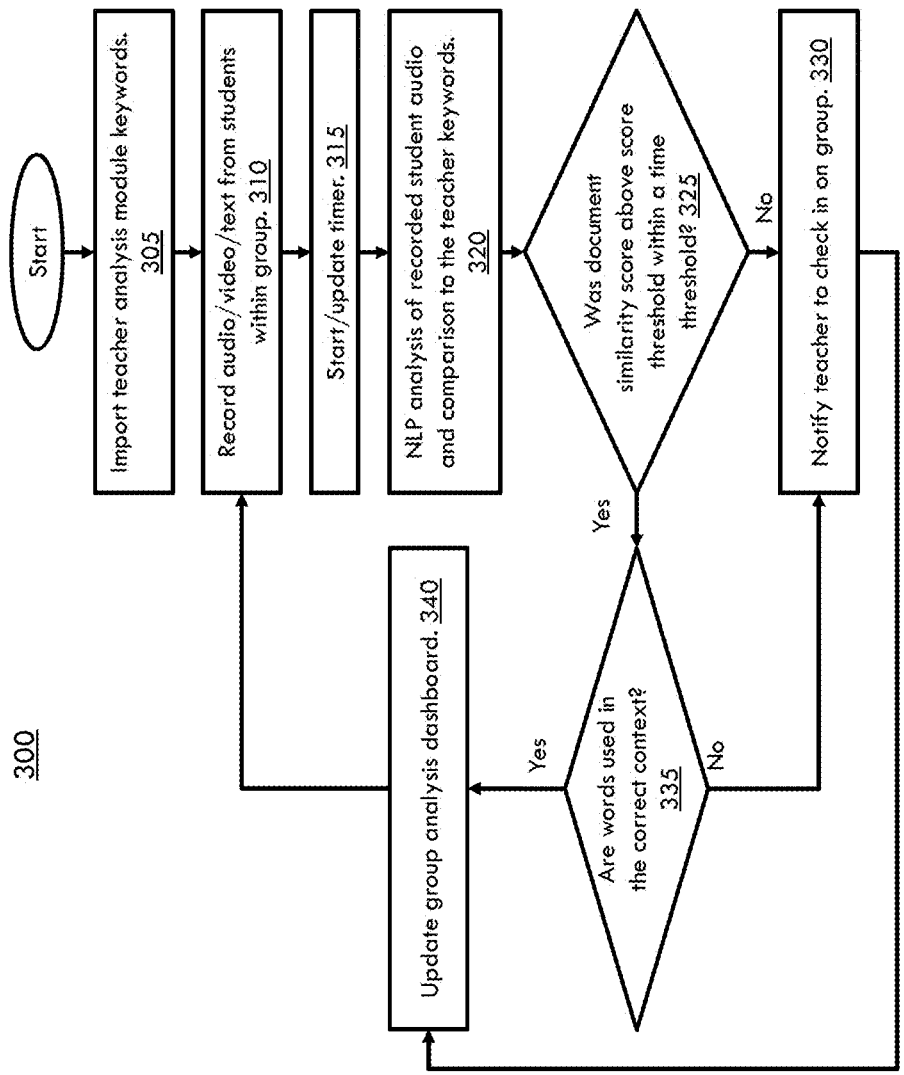
FIG. 3 is a flowchart of analyzing student activity in a live group breakout session.

FIG. 3 shows a method 300 which executes the student group analysis module 170 to analyze a single group during a breakout session to determine how closely the discussion matches the presentation material. The student group analysis module 170 may execute in each breakout group in parallel, or sequentially in an iterative loop over each breakout group.

The execution begins at block 305 where the student group analysis module 170 imports the keywords that the teacher analysis module 160 created in FIG. 2. At block 310, the method records the audio and video activities from students within the breakout group, using the camera 120 and microphone 125 on the student device 115. The camera 120 and microphone 125 on the student device 115 are already being utilized for communication among the students. In addition to audio and video, text can be captured, such as text that is entered in a chat-type application used in the session (e.g., Slack™), or a chat-type window that is part of the virtual classroom 110 or smart classroom tools 130. The student group analysis module 170 may extract data/images of a presentation or other document that the students are working on and that is shared on the screen of the virtual classroom 110. The images may be extracted as screenshots, or the student group analysis module 170 may invoke various APIs to directly extract the data from those files (e.g., an API that allows Zoom to extract data within a PowerPoint file).

At block 315, method 300 initializes or increments a timer which is checked later at decision block 325. The timer is used for periodic comparisons between the current group discussion and the teacher transcript to ensure that the students remain on topic (e.g., a similarity score is generated every 5 minutes). The similarity score is an intersection, e.g., a ratio, between how many keywords the students said that correlate with the teacher keywords. Alternatively, the comparison analysis may be performed in near real time without a timer. At block 320, and similar to the teacher analysis module 160, the student group analysis module 170 may invoke a combination of IBM Watson™ APIs to perform NLP analysis on the recorded student audio and to compare the output of the analysis to the teacher transcript on a student group basis. The comparison and analysis may also be performed on an individual student basis. The comparison can be performed using IBM Watson™ Document Correlator, which performs text analytics on text content from various sources to obtain a comprehensive understanding of the correlation across the sources, and to output a document similarity score. The comparison is of the student spoken keywords, as well as keywords derived through expansion, to the same word/phrases appearing in the teacher keywords.

At block 325, the student group analysis module 170 determines if the document similarity score generated at block 320 is above a configurable score threshold within a configurable time threshold. For example, the student group analysis module 170 may look for a similarity score >=50% within the last 5 minutes. If one or more of the breakout groups meet the score threshold (block 325 "Yes" branch), the student group analysis module 170 moves to decision block 335 for each of these breakout groups. At 335, the context of the keywords is analyzed to determine if the students are using the keywords, and if they are using the keywords properly. The keywords used may be stored temporarily for the duration of the meeting, so that the teacher can view them on the group analysis dashboard 150 if desired. Alternatively, keywords may be stored in the teacher's profile in the database 175. This provides the teacher the ability to reference previous lessons when re-teaching topics or to review student progress over time. Alternatively, the keywords may not be stored at all and only the scores are stored.

Context can be determined using application such as IBM Watson™ Natural Language Understanding. Content such as textbooks, submitted student work that was given a high grade, papers, and publications can all be used as learning input to an AI module, such as IBM Watson™ specifically trained to recognize the phrasing used by students, and that correlates well with the context of the inputs to the teacher analysis module 160. If student grades are provided, whether students used keywords correctly, shown by high grades, or did not, shown by low grades, may be observed as a function of the amount of teacher assistance provided to a group. This info can be used to alter activation functions, biases, and weights to improve future context recognition for similar topics.

Context scoring, as displayed on the group analysis dashboard 150, may indicate to the teacher that a breakout group needs assistance because the group's context score is below the score thresholds within the time threshold. The teacher may also use a breakout group's high context score as an example of successfully mastering the presentation material.

If one or more of the breakout groups do not meet the similarity score threshold (block 325 "No" branch) or if the keywords are not used in the correct context indicated by a context score being below a threshold (block 335 "No" branch), the student group analysis module 170 moves to block 330 to notify the teacher (via the group analysis dashboard 150 of the teacher device 132) that a breakout group appears to be off topic and may need teacher assistance. Where more than one of the breakout groups is below the similarity threshold or context threshold, the student group analysis module 170 may be configured to display these breakout groups by score, e.g., decreasing/increasing on the group analysis dashboard 150. Alternatively, the student group analysis module 170 may be configured to automatically join the lowest ranking breakout group of those breakout groups below the similarity threshold or context threshold. The teacher may select a breakout group from the group analysis dashboard 150 to review. Various statistics to display may include the breakout group's context score, similarity score, keywords, or speech to text translation over a past selectable amount of time for the group, or by individual.

If the keywords are used in the correct context such as being above a threshold context score (block 335 "Yes" branch), or after notifying, the teacher provides assistance to a breakout group at block 330, the student group analysis module 170 updates the group analysis dashboard 150 at block 340. A block of memory may be provided for temporary storage for the teacher's user profile that can be updated for the duration of the meeting. Preferably, the keywords are stored along with the scores for a longer duration so the teacher could go back to look at old data if desired or used as training data.

Figure 4:
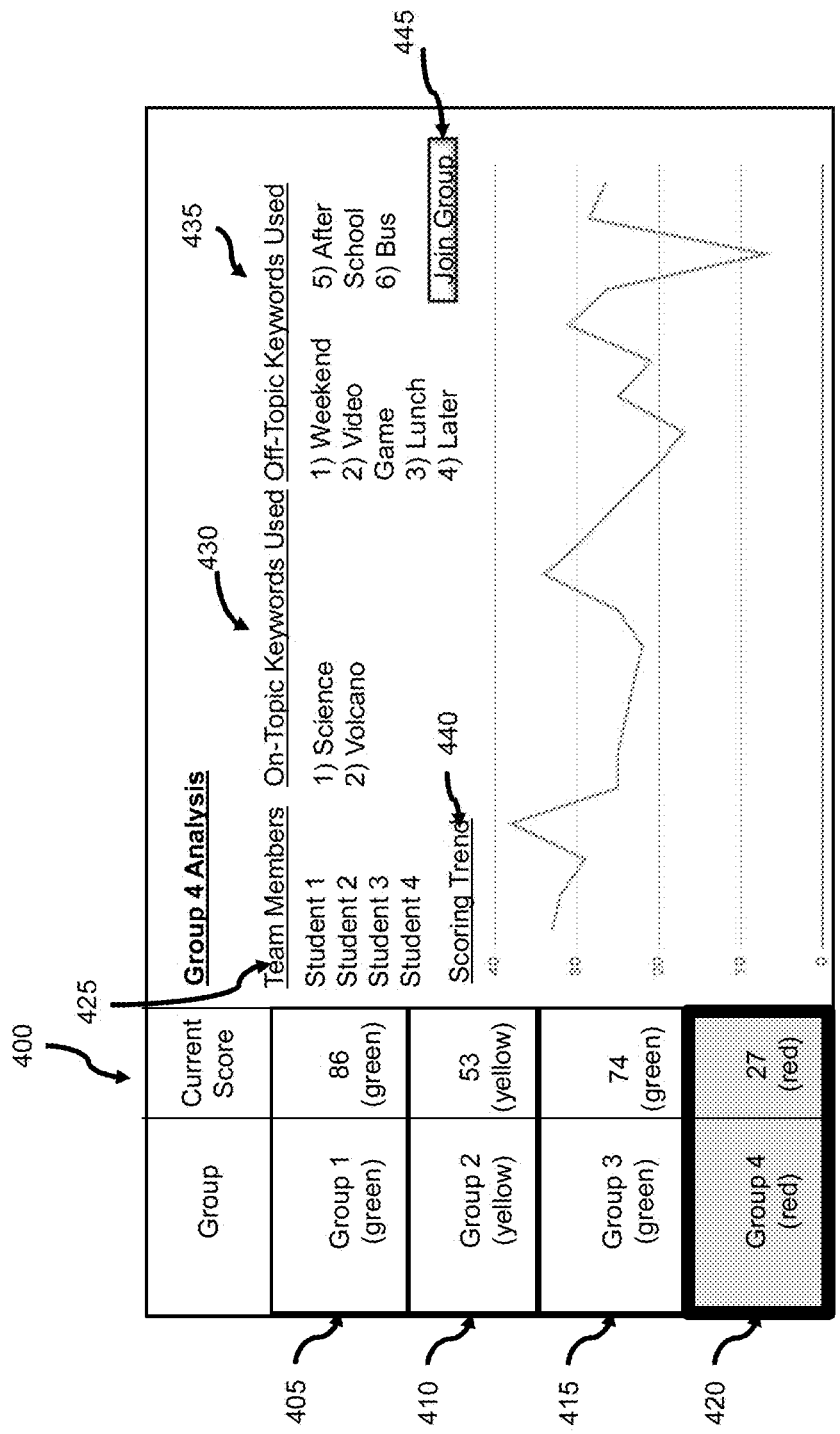
FIG. 4 is an illustrative dashboard for implementing aspects of the present invention.

FIG. 4 illustrates an exemplary dashboard that displays output of the group analysis module 170 to the teacher.

In this example, the teacher has separated the students into breakout groups 405, 410, 415, and 420. Each group is shown with its corresponding current score 400 (i.e., similarity score), as calculated by the student group analysis module 170. The display may be configured to display context score if the similarity score is above a configurable threshold value. The display of the group analysis dashboard 150 may display the current score 400 or the average context score over a configurable previous number of minutes. Opting for the average score rather than the current score 400 may provide a display that changes less frequently, and may therefore be easier to read. Similarly, the scoring trendline 440 may be displayed instead of, or in addition to, the current score 400.

The breakout groups 405, 410, 415, and 420 and the current score 400 may be highlighted with color to provide an overall breakout group status at a glance. The color is a visual enhancement to aid the teacher in more quickly assessing the performance of the various groups, and locating struggling students. Alternatively, the group analysis dashboard 150 may be configured to dynamically alter the display so that the lowest performing groups appear at the top. Here, the legend "green" for Group 1 (405) and Group 3 (415) substitutes for highlighting in green, indicating that these breakout groups are doing well with the assignment and are not currently in need of assistance.

Here, the legend "yellow" for Group 2 (410) substitutes for highlighting in yellow, suggesting that the teacher should monitor the breakout group more closely.

The teacher's attention is drawn to Group 4 420. The legend "red", which is a substitute for highlighting in red, indicates this breakout group is a top priority for assistance because this breakout group has the lowest score.

When the teacher selects (indicated by the bold black box) Group 4 (420), further information can be seen in the window to the right of the breakout group pane that includes team members 425 (i.e., the names of the students), on-topic keywords used 430, off-topic keywords used 435, scoring trendline 440, and a join group button 445 which allows the teacher to join the selected group.

By viewing on-topic keywords used 430, off-topic keywords used 435, and scoring trend 440, the teacher can see what the team members 425 are actually discussing, and may deduce that they are distracted and talking about other topics not related to the assignment. The teacher can then click join group button 445 to join the breakout session with team members 425 to help them get back on track with the assignment.

On-topic keywords 430 can include keywords specific to a topic, textbook, chapter, or handout for an assignment; they may also include words of phrases for general understanding (e.g., "I understand", "I get the assignment", "we need to do . . . ", etc.) and may be stored in database 175.

The teacher may also upload general keywords that are related to the presentation subject. For example, a class presenting science topics may include keywords specific to the presentation subject material, such as "science", "biology", "organism", "genetics", "living", "plants", etc.

The teacher may temporarily, and in real-time, change the designation of a keyword from off-topic to on-topic, or from on-topic to off-topic, depending on the context of the presentation materials, and whether the discussions generally are trending away from the presentation subject matter. This feature may assist the teacher to focus the discussions of the breakout groups if a scoring trend 440 indicates the conversation is trending off-topic.

Off-topic keywords 435 can include specific words/phrases that indicate that one or more students need help (e.g., "I'm confused", "I don't understand", "what are we doing", etc.) or are common words spoken when students are off-topic.

The context of words should be evaluated, for example by the IBM Watson™ Natural Language Understanding API, to identify both on-topic keywords 430 and off-topic keywords 435 (e.g., the word "understand" could be used in either instance of on-topic ("I understand") or off-topic ("I don't understand") to ensure the words are categorized correctly to provide an accurate context score.

The context of student interaction may also be considered (e.g., a first student may say "what are we supposed to do" but a second student within the same group responds "we need to . . . " which would indicate that the second student understands and is assisting the first student and the rest of the breakout group).

Figure 5:
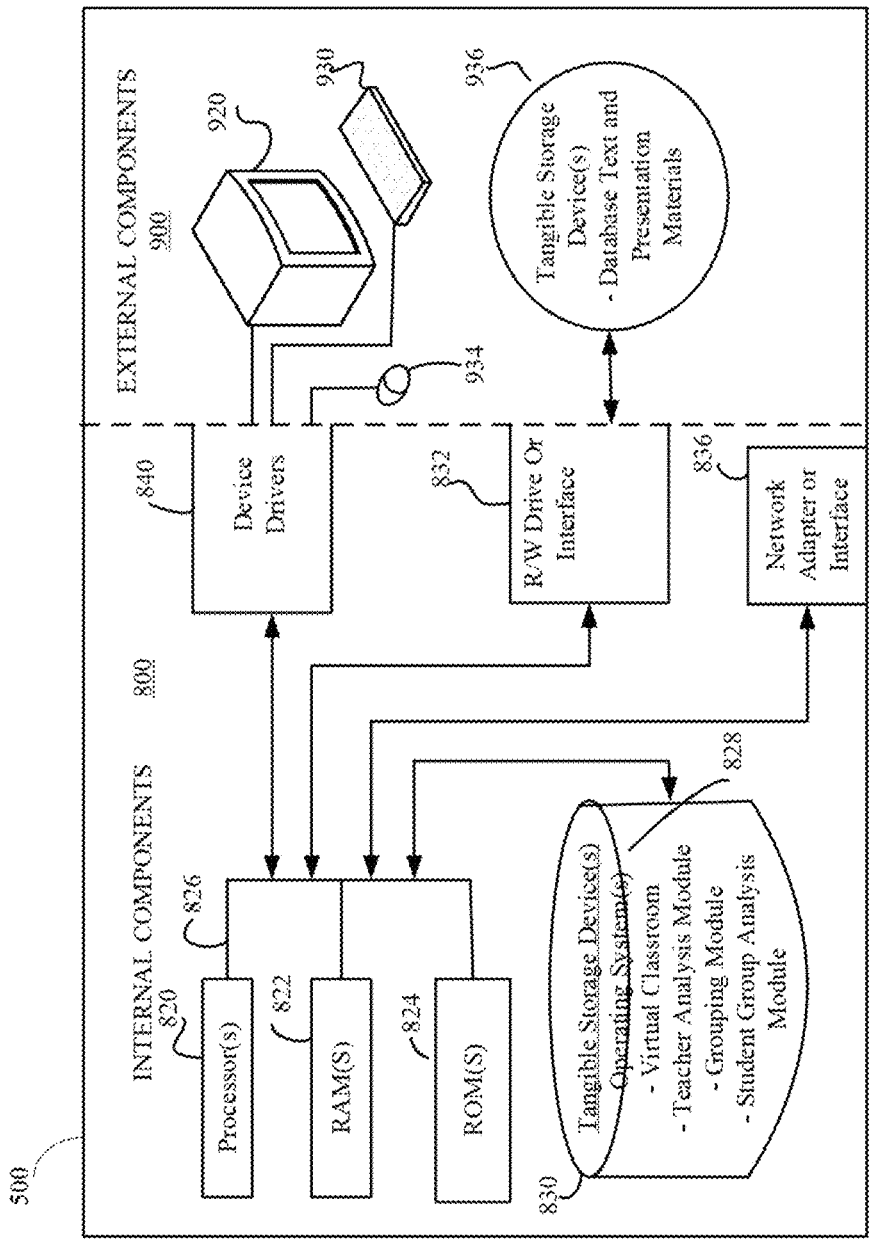
FIG. 5 illustrates an exemplary computing device 500 applicable for executing the algorithm of FIGS. 2-3.

FIG. 5 illustrates an exemplary computing device 500 applicable for executing the algorithm of FIGS. 2-3. Computing device 500 may include respective sets of internal components 800 and external components 900 that together may provide an environment for a software application. Each of the sets of internal components 800 includes one or more processors 820; one or more computer-readable RAMs 822; one or more computer-readable ROMs 824 on one or more buses 826; one or more operating systems, virtual classroom 110, the teacher analysis module 160, grouping module 165, and student group analysis module 170, 828 executing the algorithm of FIGS. 2-3; and one or more computer-readable tangible storage devices 830. The one or more operating systems 828 are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage device(s) 936 such as a CD-ROM, DVD, SSD, USB memory stick, and magnetic disk. In FIG. 5, tangible storage device(s) includes storage for a database 175 in which is stored presentation materials and associated text, keywords, transcripts.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 500, can be downloaded to computing device 500 from an external computer (e.g., server) via a network (for example, the Internet, a local area network, or other wide area network) and respective network adapters or interfaces 836. From the network adapters (or switch port adapters) or interfaces 836 and operating system 828 associated with computing device 500 are loaded into the respective hard drive 830 and network adapter 836.

External components 900 can also include a touch screen 920 and pointing devices 930. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:
1. A method comprising:
  receiving a plurality of presentation source materials, wherein the plurality of presentation source materials includes text documents, books, video files, audio files, and presentations;
  generating a transcript from audio and video received from a presenter device during a live teaching session;
  extracting keywords from the plurality of presentation source materials; and creating an integrated keyword list by integrating the extracted keywords with the generated transcript,
wherein said method further comprising selecting on the presenter device one of a plurality of live group breakout sessions;
displaying on the presenter device details for the selected live group breakout session, wherein the details include a similarity score and/or a context score by group, participant identifiers, on-topic keywords, off-topic keywords, and a scoring trend; and in response to selecting an option on the presenter device, joining the presenter device to the live group breakout session.

2. The method of claim 1, further comprising:
grouping participants in an online meeting into a plurality of live group breakout sessions, wherein the participants are geographically distant from each other and geographically distant from a presenter, and wherein the live group breakout sessions are independent of each other.

3. The method of claim 1, further comprising:
importing the integrated keyword list;
continuously recording data from each participant in a live group breakout session, wherein the recorded data are analyzed to produce a participant output, wherein the participant output comprises participant sentiment, language patterns, and a list of keywords for each of one or more participants;
periodically analyzing a correlation between the integrated keyword list and the participant output, wherein the correlation indicates a level of comprehension of the integrated keyword list by each of the one or more participants;
calculating a similarity score and a context score for the live group breakout session from combined correlations of the participants; and
displaying on the presenter device the similarity scores and/or the context scores for each live group breakout session.

4. The method of claim 3, wherein the recorded data comprises live video, live audio, inaudible sounds, periods of silence, and text messages extracted from an online meeting.

5. The method of claim 1, wherein a keyword designation is changed and/or a keyword is added in real time based on the scoring trend indicating an increased difference between the similarity score and the scoring trend.

6. The method of claim 1, wherein a context score measures a degree of correct usage of the integrated keyword list, based on a comparison of the context score to a configurable threshold within a configurable period of time.

7. A computer program product, wherein the computer program product comprises a non-transitory computer readable storage medium having program instructions embodied therewith, the program instructions executable by a processing unit to cause the processing unit to perform a method comprising:
receiving a plurality of presentation source materials, wherein the plurality of presentation source materials includes text documents, books, video files, audio files, and presentations;
generating a transcript from audio and video received from a presenter device during a live teaching session;
extracting keywords from the plurality of presentation source materials; and
creating an integrated keyword list by integrating the extracted keywords with the generated transcript,
wherein said computer program product further comprising selecting on the presenter device one of a plurality of live group breakout sessions;
displaying on the presenter device details for the selected live group breakout session, wherein the details include a similarity score and/or a context score by group, participant identifiers, on-topic keywords, off-topic keywords, and a scoring trend; and in response to selecting an option on the presenter device, joining the presenter device to the live group breakout session.

8. The computer program product of claim 7, further comprising:
grouping participants in an online meeting into a plurality of live group breakout sessions, wherein the participants are geographically distant from each other and geographically distant from a presenter, and wherein the live group breakout sessions are independent of each other.

9. The computer program product of claim 7, further comprising:
importing the integrated keyword list;
continuously recording data from each participant in a live group breakout session, wherein the recorded data are analyzed to produce a participant output, wherein the participant output comprises participant sentiment, language patterns, and a list of keywords for each of one or more participants;
periodically analyzing a correlation between the integrated keyword list and the participant output, wherein the correlation indicates a level of comprehension of the integrated keyword list by each of the one or more participants;
calculating a similarity score and a context score for the live group breakout session from combined correlations of the participants; and
displaying on the presenter device the similarity scores and/or the context scores for each live group breakout session.

10. The computer program product of claim 9, wherein the recorded data comprises live video, live audio, inaudible sounds, periods of silence, and text messages extracted from an online meeting.

11. The computer program product of claim 7, wherein a keyword designation is changed and/or a keyword is added in real time based on the scoring trend indicating an increased difference between the similarity score and the scoring trend.

12. The computer program product of claim 7, wherein a context score measures a degree of correct usage of the integrated keyword list, based on a comparison of the context score to a configurable threshold within a configurable period of time.

13. The computer program product of claim 7, wherein the presentation materials further comprise: textbook ISBN identifiers, specific book chapter chapters and/or sections, websites, articles, and videos.

14. A computer system, comprising: one or more processors; and a computer-readable memory coupled to the one or more processors, the computer-readable memory comprising instructions for:
receiving a plurality of presentation source materials, wherein the plurality of presentation source materials includes text documents, books, textbook ISBN identifiers, specific book chapters, specific book sections, websites, video files, audio files, and presentations;
generating a transcript from audio and video received from a presenter device during a live teaching session;

extracting keywords from the plurality of presentation source materials; and creating an integrated keyword list by integrating the extracted keywords with the generated transcript, wherein said computer system further comprising: selecting on the presenter device one of a plurality of live group breakout sessions; displaying on the presenter device details for the selected live group breakout session wherein the details include a similarity score and/or a context score by group, participant identifiers, on-topic keywords, off-topic keywords, and a scoring trend; and in response to selecting an option on the presenter device, joining the presenter device to the live group breakout session.

15. The computer system of claim 14, further comprising:

grouping participants in an online meeting into a plurality of live group breakout sessions, wherein the participants are geographically distant from each other and geographically distant from a presenter, and wherein the live group breakout sessions are independent of each other.

16. The computer system of claim 14, further comprising: importing the integrated keyword list;

continuously recording data from each participant in a live group breakout session, wherein the recorded data are analyzed to produce a participant output, wherein the participant output comprises participant sentiment, language patterns, and a list of keywords for each of one or more participants;

periodically analyzing a correlation between the integrated keyword list and the participant output, wherein the correlation indicates a level of comprehension of the integrated keyword list by each of the one or more participants;

calculating a similarity score and a context score for the live group breakout session from combined correlations of the participants; and displaying on the presenter device the similarity scores and/or context scores for each live group breakout session.

17. The computer system of claim 14, wherein the recorded data comprises live video, live audio, inaudible sounds, periods of silence, and text messages extracted from an online meeting.

* * * * *